(12) United States Patent
Björklund et al.

(10) Patent No.: US 8,661,225 B2
(45) Date of Patent: Feb. 25, 2014

(54) DATA PROCESSING APPARATUS AND METHOD FOR HANDLING VECTOR INSTRUCTIONS

(75) Inventors: Andreas Björklund, Lund (SE); Erik Persson, Lund (SE); Ola Hugosson, Lund (SE)

(73) Assignee: ARM Limited, Cambridge (GB)

( * ) Notice: Subject to any disclaimer, the term of this patent is extended or adjusted under 35 U.S.C. 154(b) by 850 days.

(21) Appl. No.: 12/656,152

(22) Filed: Jan. 19, 2010

(65) Prior Publication Data

US 2010/0312988 A1     Dec. 9, 2010

(30) Foreign Application Priority Data

Jun. 5, 2009  (GB) .................................. 0909756.9

(51) Int. Cl.
G06F 15/00     (2006.01)

(52) U.S. Cl.
USPC ................................................. 712/5; 712/22

(58) Field of Classification Search
None
See application file for complete search history.

(56) References Cited

U.S. PATENT DOCUMENTS

| | | | |
|---|---|---|---|
| 5,799,163 | A | 8/1998 | Park et al. |
| 6,986,025 | B2 * | 1/2006 | Wilson ........................ 712/226 |
| 7,428,628 | B2 * | 9/2008 | Fenney ........................ 712/13 |
| 2007/0250681 | A1 | 10/2007 | Horvath et al. |
| 2008/0016320 | A1 | 1/2008 | Menon et al. |
| 2008/0114975 | A1 | 5/2008 | Yen |

FOREIGN PATENT DOCUMENTS

| | | |
|---|---|---|
| EP | 0 216 700 | 4/1987 |
| EP | 0 574 909 | 12/1993 |
| GB | 2 411 745 | 9/2005 |
| JP | 60-59469 | 4/1985 |
| JP | 9-91272 | 4/1997 |

(Continued)

OTHER PUBLICATIONS

International Search Report and Written Opinion of the International Searching Authority dated Sep. 24, 2010 for PCT/GB2010/001067.

(Continued)

*Primary Examiner* — Andrew Caldwell
*Assistant Examiner* — Benjamin Geib
(74) *Attorney, Agent, or Firm* — Nixon & Vanderhye P.C.

(57) ABSTRACT

A data processing apparatus and method and provided for handling vector instructions. The data processing apparatus has a register data store with a plurality of registers arranged to store data elements. A vector processing unit is then used to execute a sequence of vector instructions, with the vector processing unit having a plurality of lanes of parallel processing and having access to the register data store in order to read data elements from, and write data elements to, the register data store during the execution of the sequence of vector instructions. A skip indication storage maintains a skip indicator for each of the lanes of parallel processing. The vector processing unit is responsive to a vector skip instruction to perform an update operation to set within the skip indication storage the skip indicator for a determined one or more lanes. The vector processing unit is responsive to a vector operation instruction to perform an operation in parallel on data elements input to the plurality of lanes of parallel processing, but to exclude from the performance of the operation any lane whose associated skip indicator is set. This allows the operation specified by vector instructions to be performed conditionally within each of the lanes of parallel processing without any modification to the vector instructions that are specifying those operations.

21 Claims, 8 Drawing Sheets

(56) References Cited

FOREIGN PATENT DOCUMENTS

| JP | 2007-526571 | 9/2007 |
| JP | 2009-86870 | 4/2009 |
| WO | WO 02/46885 | 6/2002 |
| WO | WO 02/084451 | 10/2002 |
| WO | WO 2005/086017 | 9/2005 |
| WO | WO 2006/044978 | 4/2006 |

OTHER PUBLICATIONS

UK Search Report dated Sep. 15, 2009 for GB 0909756.9.
English Translation of Japanese Office Action mailed Oct. 29, 2013 in Japanese Application No. 2012-513670.

* cited by examiner

| COMBINED ENCODING | SHORT SKIP COUNT | LONG SKIP COUNT |
|---|---|---|
| 0 | 0 | 0 |
| 1 | 1 | 0 |
| 2 | 2 | 0 |
| 3 | 3 | 0 |
| 4 | 4 | 0 |
| 5 | 5 | 0 |
| 6 | 6 | 0 |
| 7 | 7 | 0 |
| 8 | 8 | 0 |
| 9 | 9 | 0 |
| 10 | 10 | 0 |
| 11 | 11 | 0 |
| 12 | 12 | 0 |
| 13 | 13 | 0 |
| 14 | 0 | 2 |
| 15 | 0 | 1 |

FIG. 9

DATA PROCESSING APPARATUS AND METHOD FOR HANDLING VECTOR INSTRUCTIONS

This application claims priority to United Kingdom Application No. 0909756.9 filed 5 Jun. 2009, the entire contents of which is hereby incorporated by reference.

FIELD

The present invention relates to a data processing apparatus and method for handling vector instructions.

BACKGROUND

Vector processing is a processing technique which is becoming more and more commonplace in data processing systems. Vector processing units have been developed for performing such vector processing operations, and allow operations to be performed on multiple data elements simultaneously. The vector processing unit provides a plurality of lanes of parallel processing such that when data elements are input to those lanes of parallel processing, a data processing operation can be performed in parallel within those lanes of parallel processing. This enables significant performance benefits to be realised when compared with scalar processing techniques which would require the data processing operation to be performed multiple times sequentially, typically using different input data elements for each iteration.

US 2007/0250681 describes such a vector processing unit, in the system described therein the vector processing unit taking the form of a coprocessor performing vector processing operations as required by a host processor. As an alternative approach to providing the vector processing unit as a coprocessor, it is possible to extend the base architecture of a standard processor by replicating part of its core processing elements and adding special instructions which allow multiple data elements to be processed in these units simultaneously.

There are many types of data processing operations which can benefit from the use of vector processing. For example, computer graphics hardware and video game consoles rely heavily on vector processors in their architecture in order to provide high performance graphics processing functions.

The data elements to be processed by vector processing units are typically arranged into vectors of data elements, where each vector comprises a plurality of data elements, and where each data element in the vector forms an input data element for a different lane of parallel processing.

Whilst the above discussed vector processing approach can yield very significant performance benefits in situations where all of the data elements in the input vectors need to be subjected to a particular data processing operation, situations arise where it would be desirable to make performance of a particular operation conditional within the various lanes of parallel processing. In accordance with such an approach, vectors of input data elements would still be provided to the vector processing unit, but the operation specified by a particular vector instruction would not necessarily be performed within all of the lanes of parallel processing.

However, it is a complex issue to seek to encode such conditionality within the vector instruction that is defining the vector operation to be performed on the input data elements, and is likely to result in a significant increase in the size of such an instruction. Accordingly, it is often the case that where such conditionality is required, the vector processing unit is not used, and instead a sequence of scalar operations are performed within a scalar processing unit to perform the required operation on that subset of data elements for which performance of the operation is required.

However, this significantly impacts performance, and it would be desirable to allow the performance benefits of using the vector processing unit to be realised even in situations where conditional execution within each of the lanes of parallel processing is required.

SUMMARY

Viewed from a first aspect, the present invention provides a data processing apparatus comprising: a register data store having a plurality of registers arranged to store data elements; a vector processing unit for executing a sequence of vector instructions, the vector processing unit having a plurality of lanes of parallel processing and having access to the register data store in order to read data elements from, and write data elements to, the register data store during the execution of said sequence of vector instructions; a skip indication storage for maintaining a skip indicator for each of said lanes of parallel processing; the vector processing unit being responsive to a vector skip instruction within said sequence of vector instructions to perform an update operation to set within the skip indication storage the skip indicator for a determined one or more lanes of said plurality of lanes; and the vector processing unit being responsive to a vector operation instruction within said sequence of vector instructions to perform an operation in parallel on data elements input to said plurality of lanes of parallel processing, but to exclude from the performance of said operation any lane whose associated skip indicator is set.

In accordance with the present invention, a skip indicator is maintained for each of the lanes of parallel processing. A vector skip instruction is then used which when executed by the vector processing unit causes an update operation to be performed, as a result of which the skip indicator for a determined one or more lanes of parallel processing is set.

When executing vector operation instructions, the vector processing unit is arranged to reference the skip indicators for each of the lanes of parallel processing, and to exclude from the performance of the operation specified by the vector operation instruction, any lane whose associated skip indicator is set.

Accordingly, through the use of such skip indicators for each of the lanes of parallel processing, and the setting of those skip indicators using the vector skip instruction, it is possible to provide conditional execution of vector operation instructions within each lane of parallel processing without needing to modify the vector operation instructions themselves. This hence enables an increase in the utilisation of the vector processing unit to be achieved, since operations which might otherwise have to be performed in a serial manner can now be processed in parallel using the vector processing unit, given the ability to selectively exclude one or more lanes of parallel processing from the performance of those operations.

Whilst in one embodiment, execution of the vector skip instruction may cause all of the lanes to be subject to the update operation irrespective of whether the skip indicators for those lanes are already set or not, in one embodiment, when executing the vector skip instruction, the vector processing unit excludes from the update operation any skip indicators that are already set at the time that vector skip instruction is executed. Hence, in this embodiment, any skip indicators that are already set at the time the vector skip instruction is executed are excluded from the update operation, and accordingly application of the vector skip instruction itself can be made conditional.

The skip indicators can take a variety of forms. However, in one embodiment, each skip indicator comprises a skip count value which is considered set when having a non-zero value and is considered not set when having a zero value. In such an embodiment, the vector processing unit is responsive to the vector skip instruction to set the skip count value for said determined one or more lanes to a predetermined non-zero value, and for each vector instruction within said sequence, if said skip count value is set at the time that vector instruction is executed, the vector processing unit is arranged to decrement the skip count value instead of performing the operation specified by that vector instruction. As a result, the number of subsequent vector instructions to be skipped can be varied depending on the predetermined non-zero value to which the skip count values are initially set. Further, in embodiments where the vector skip instructions themselves are only executed in respect of skip indicators that are not already set, it will be appreciated that over time individual skip count values can take a variety of values, and hence the point at which individual skip count values are cleared by the abovementioned decrementing process will vary. This allows nesting of the vector skip instructions, allowing complex sequences of conditional operations to be performed within the vector processing unit without any modification to the vector operation instructions themselves. Instead, the lanes of parallel processing that are subjected to any particular vector operation are determined by the state of the various skip count values at the time the associated vector operation instruction is executed.

In one embodiment the skip count value may be a single bit value allowing just a single subsequent vector instruction to be skipped, but in alternative embodiments, multi-bit skip count values may be provided. By providing multi-bit skip count values, it is possible to achieve complex nesting of the skip functionality.

The predetermined non-zero value to which the skip count values are set by the vector skip instruction may be fixed. However, in one embodiment the predetermined non-zero value is specified as an operand of the vector skip instruction.

As mentioned earlier, for each vector instruction executed, if the skip count value is set at the time that instruction is executed, the skip count value is decremented instead of performing the operation specified by the vector instruction. In one embodiment, this applies not only to vector operation instructions but also to the vector skip instructions themselves.

In one embodiment, when executing the vector skip instruction, the update operation will only be performed in respect of those skip indicators which are not set (i.e. are at a zero value) at the time the skip instruction is executed. In one such embodiment, execution of the vector skip instruction will merely cause the relevant skip indicators to be set and no further action will be taken by execution of the vector skip instruction in respect of those "just set" skip indicators. However, in an alternative embodiment, the vector skip instruction may be arranged to decrement all set skip count values, whether those set skip count values were set prior to the vector skip instruction being executed, or have just been set due to the execution of the vector skip instruction. In such embodiments, it will be appreciated that the predetermined non-zero value will typically be at least two, to ensure that at least one instruction following the vector skip instruction is skipped.

As an alternative to arranging the skip indicators as skip count values which are set via the vector skip instruction, and then decremented on execution of each subsequent vector instruction until they return to a zero value, in one embodiment each skip indicator remains set until the vector processing unit executes a vector skip end instruction to clear the set skip indicator. Given a particular size of skip indication storage, such an approach would allow for a longer sequence of instructions to be skipped in an identified lane than it would be possible to specify via a skip count value within the skip indication storage.

In embodiments where the skip indicator remains set until the vector processing unit executes a skip end instruction to clear the set skip indicator, the set skip indicator can be embodied as a single bit value. Following the setting of the skip indicator, as each subsequent vector instruction is encountered during execution, no action is taken in the lane for which the skip indicator has been set, and hence the operations specified by those following vector instructions are not performed within that lane. When a skip end instruction is encountered, the skip indicator is then cleared, such that subsequent instructions will be executed within that lane. In a further embodiment, the skip indicator can be given a multi-bit value, with only skip end instructions causing the multi-bit value to be decremented. This allows nesting to be performed such that a particular instance of a skip end instruction might cause the skip indicator for certain lanes to be cleared (since the skip value is decremented to zero) whilst for others the decrementing step will still leave the skip indicator set (since the decrementing still leaves the count value non-zero).

In one embodiment both skip indicators in the form of skip count values which are decremented on occurrence of each subsequently executed vector instruction, and skip indicators which remain set until execution of a skip end instruction, can be used in combination. Hereafter, if necessary for clarification, the latter type of skip indicator which remains set until execution of a skip end instruction will be referred to as a "long skip" indicator, and the former type of skip indicator will be referred to as a "short skip" indicator. In particular, in one embodiment, in addition to short skip count values, said skip indication storage further maintains a long skip indicator for each of said lanes of parallel processing. A further vector skip instruction is then provided, which when executed by the vector processing unit causes the long skip indicator for each of said determined one or more lanes to be set instead of the skip count values for those lanes, the long skip indicators remaining set as each vector instruction is executed.

As discussed above, the long skip indicators may be single bit values in which case the vector processing unit is responsive to a skip end instruction to clear each set long skip indicator. Alternatively, each long skip indicator comprises a long skip count value which is considered set when having a non-zero value and is considered not set when having a zero value. Responsive to the further vector skip instruction, the vector processing unit causes the long skip count value for each of said determined one or more lanes to be incremented, and the vector processing unit is responsive to a vector skip end instruction to decrement each set long skip count value.

Accordingly, in such embodiments, whilst the short skip count values are decremented on occurrence of each vector instruction after they have been set, the long skip count values are only decremented by skip end instructions, and other types of vector instructions will not cause those long skip count values to be decremented.

The skip indication storage can be arranged in a variety of ways. In one embodiment, the skip indication storage may comprise a first register for storing the short skip indicators for each of the lanes of parallel processing, and a second register for storing the long skip indicators for each of the lanes of parallel processing.

However, in an alternative embodiment, the skip indication storage may comprise a single register for storing the skip indicators for each of the lanes of parallel processing, with the manner in which the skip indicator is encoded for each lane identifying whether it is a short skip indicator or a long skip indicator. In particular, in one embodiment, each skip indicator is settable by the vector processing unit to any of a first plurality of non-zero values to identify set short skip count values, and is settable to at least one predetermined non-zero value not in the first plurality in order to identify a set long skip indicator. As a specific example, considering the situation where the skip indication storage provides four bit values for each skip indicator, at least the value "1111" can be reserved to identify a set long skip indicator.

In one particular embodiment, both the values 1111 and 1110 are reserved to specify set long skip indicators, allowing short skip count values between 1 and 13 to be specified. Hence, in such embodiments, if a skip of longer than 13 subsequent vector instructions is required, the long skip indicator will need to be used rather than the short skip indicator.

In one embodiment, the vector skip instruction specifies as a skip indicator operand the predetermined non-zero value to which the short skip indicators for the determined one or more lanes are to be set. Whilst the further vector skip instruction used to set long skip indicators may be an entirely separate instruction to the vector skip instruction, in one embodiment both the vector skip instruction and further vector skip instruction are of the same form, but the further vector skip instruction specifies as the skip indicator operand a null value to thereby distinguish the further vector skip instruction from the vector skip instruction.

There are a number of ways in which the vector processing unit may determine the lanes whose skip indicators are to be set on execution of the vector skip instruction. In one embodiment, the vector skip instruction directly identifies the determined one or more lanes whose skip indicators are to be set. Hence, as an example a particular form of vector skip instruction may specify that all odd lanes should have their skip indicators set, another form of vector skip instruction may specify that all even lanes should have their skip indicators set, or more generally the vector skip instruction may identify some form of bit mask identifying which lanes should have their skip indicators set.

However, in an alternative embodiment, the vector skip instruction does not directly identify the lanes whose skip indicators are to be set, and instead, responsive to the vector skip instruction, the vector processing unit evaluates for each lane whether one or more predetermined conditions are met, and identifies said determined one or more lanes whose skip indicators are to be set dependent on said evaluation.

In one embodiment, the lanes whose skip indicators are set are those lanes for which the one or more predetermined conditions are met. However, it will be appreciated that in an alternative embodiment the lanes whose skip indicators are set can be chosen to be those lanes for which the one or more predetermined conditions are not met.

There are a number of ways in which the vector processing unit may be caused to evaluate whether the one or more predetermined conditions are met when executing the vector skip instruction. In one embodiment, the vector processing unit, during the execution of the vector skip instruction, may perform the required tests to check whether the predetermined conditions are met. However, in an alternative embodiment, the data processing apparatus further comprises condition code storage for storing at least one condition code for each of said lanes of parallel processing, and the vector processing unit is arranged to evaluate for each lane whether said one or more predetermined conditions are met by checking whether said at least one condition code is set. Condition codes are commonly used within data processing systems, with various instructions such as compare instructions being used to evaluate particular conditions as a program executes, and to set the condition codes accordingly. Some examples of condition codes are equal (EQ), not equal (NE), greater than (GT), less than (LT) codes, etc. For a vector processing unit with multiple lanes of parallel processing, these condition codes can be specified for each of the lanes of parallel processing. In such embodiments, the vector skip instruction can specify one or more condition codes that need to be set in order to trigger the setting of the skip indicator for the relevant lane. As an example, the vector skip instruction may identify that the skip indicators should be set for those lanes where the "greater than" condition code is set.

There are a number of ways in which, for a lane whose skip indicator is set, that lane can be excluded from the performance of the operation specified by a vector instruction. In one embodiment, the actual computations performed within the lane to implement the operation can be prevented at the outset. However, in an alternative embodiment, those computations are actually allowed to take place within the lane, but the result value produced is then discarded, thereby in effect excluding that lane from the performance of the operation as far as the rest of the system is concerned. From a control point of view, it is often simpler to implement the approach where the results are selectively discarded based on the value of the skip indicators, rather than actually preventing the computations within the lane from taking place.

The register data store used to store the data elements for access by the vector processing unit can take a variety of forms. However, in one embodiment the register data store comprises a vector register bank comprising a plurality of vector registers, each vector register storing a plurality of data elements to be provided to different lanes of parallel processing within said vector processing unit. In one embodiment, a single vector register may store sufficient data elements for one data element to be provided to each of the lanes of parallel processing within the vector processing unit.

In one embodiment, the vector processing units and associated register data store may be formed as a separate, dedicated, vector processor. Such a processor may for example be used as a coprocessor within a larger system to perform vector processing operations on behalf of a host processor. In an alternative embodiment, the vector processing unit may form a vector processing branch within a processor that also supports scalar operations in one or more different branches. Hence, in such embodiments, the data processing apparatus may further comprise a scalar processing unit and a scalar register bank associated with the scalar processing unit. In one embodiment, the scalar processing unit and vector processing unit may have separate instruction fetch and instruction decoding units, but in an alternative embodiment the instruction fetch and instruction decoding units are shared between the scalar processing unit and the vector processing unit.

In one embodiment, the vector processing unit is a pipelined processing unit allowing multiple vector instructions to be in the process of execution at any one time.

The skip indication storage that maintains the skip indicators for each of the lanes of parallel processing may be implemented in a variety of ways. For example, the skip indication storage could be provided by one of the registers in the register data store. However, in an alternative embodiment, the skip indication storage is formed by internal storage within the vector processing unit, in one particular embodiment the skip indication storage being provided by internal state registers associated with an execute stage of a pipelined vector processing unit.

Viewed from a second aspect, the present invention provides a method of handling vector instructions within a data processing apparatus comprising a register data store having a plurality of registers arranged to store data elements, and a vector processing unit for executing a sequence of vector instructions, the vector processing unit having a plurality of lanes of parallel processing and having access to the register data store in order to read data elements from, and write data elements to, the register data store during the execution of said sequence of vector instructions, the method comprising the steps of maintaining within a skip indication storage a skip indicator for each of said lanes of parallel processing; responsive to a vector skip instruction within said sequence of vector instructions, performing an update operation to set within the skip indication storage the skip indicator for a determined one or more lanes of said plurality of lanes; and responsive to a vector operation instruction within said sequence of vector instructions, performing an operation in parallel on data elements input to said plurality of lanes of parallel processing, but excluding from the performance of said operation any lane whose associated skip indicator is set.

Viewed from a third aspect, the present invention provides a computer program product comprising computable readable instructions which when executed on a computer cause the computer to perform a method of handling vector instructions in accordance with the second aspect of the present invention.

Viewed from a fourth aspect the present invention provides a data processing apparatus comprising: register data store means having a plurality of register means for storing data elements; vector processing means for executing a sequence of vector instructions, the vector processing means for providing a plurality of lanes of parallel processing and for having access to the register data store means for reading data elements from, and writing data elements to, the register data store means during the execution of said sequence of vector instructions; skip indication storage means for maintaining a skip indicator for each of said lanes of parallel processing; the vector processing means, responsive to a vector skip instruction within said sequence of vector instructions, for performing an update operation to set within the skip indication storage means the skip indicator for a determined one or more lanes of said plurality of lanes; and the vector processing means, responsive to a vector operation instruction within said sequence of vector instructions, for performing an operation in parallel on data elements input to said plurality of lanes of parallel processing, but for excluding from the performance of said operation any lane whose associated skip indicator is set.

BRIEF DESCRIPTION OF THE DRAWINGS

The present invention will be described further, by way of example only, with reference to embodiments thereof as illustrated in the accompanying drawings, in which:

FIG. 9 is a table illustrating a combined encoding that can be used when using the skip counter register of FIG. 8C in accordance with one embodiment.

DESCRIPTION OF NON-LIMITING EXAMPLE EMBODIMENTS

Figure 1:
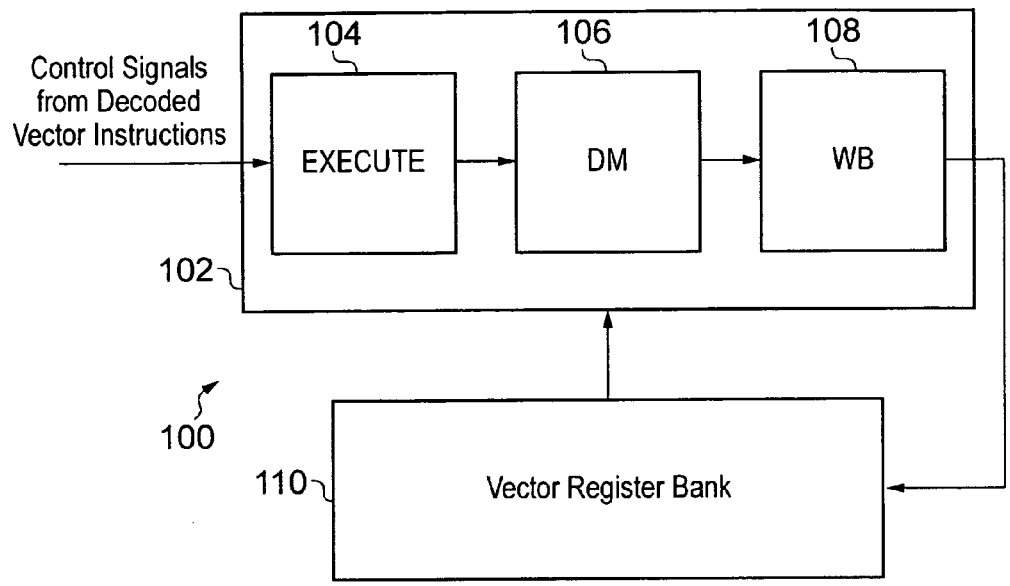
FIG. 1 schematically illustrates at least a part of a processor according to an embodiment.
Figure 3:
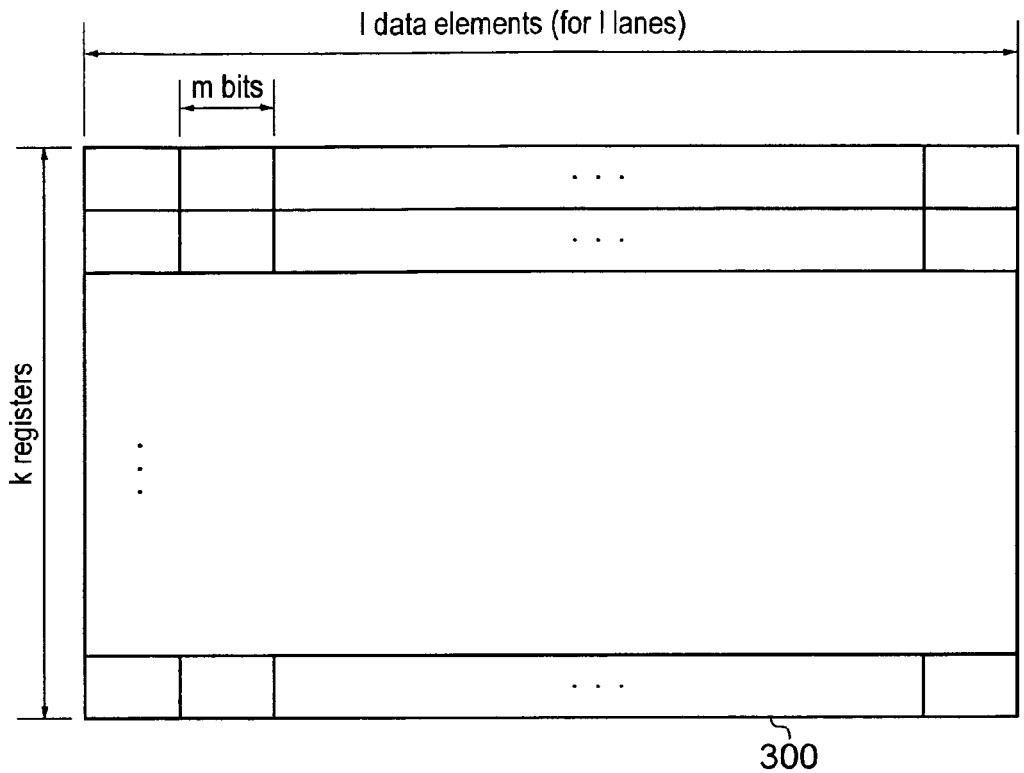
FIG. 3 schematically illustrates a vector register bank according to an embodiment.

FIG. 1 schematically illustrates at least a part of a processor 100 according to an embodiment. The processor 100 comprises a dedicated vector processing unit (also referred to herein as a vector execution unit) 102 to which the control signals from decoded vector instructions are fed. The processor 100 is preferably a pipelined processor, where the dedicated vector execution unit 102 can comprise stages for arithmetic logical operations 104, data memory access 106, and register write back 108. Associated with the dedicated vector execution unit 102, there is provided a vector register bank 110 comprising a first number k of vector registers each comprising a second number 1 of data elements where each data element has a third number m of bits, for example as illustrated in FIG. 3. The vector processing unit comprises a plurality of lanes of parallel processing, and in one embodiment, when executing a vector instruction specifying one or more input vector registers, each lane receives one of the data elements from each specified input vector register. Hence, in this embodiment each of the vector registers can be seen to store the data elements for l lanes of parallel processing, as illustrated schematically in FIG. 3.

Upon reception of the control signals from decoded vector instructions, the dedicated vector execution unit 102 reads necessary values from the register bank 110, and when the decoded vector instruction is executed through the pipeline, the write back stage feeds any new register values to the register bank for writing. In some embodiments forwarding paths will also be provided to allow result values from one operation to be fed back directly as inputs to a subsequent operation without the need to re-read those values from the register bank 110.

As will be discussed in more detail later, upon reception and execution of a skip instruction, the dedicated vector execution unit 102 controls skip indicators, e.g. skip counters, associated with each of the lanes of parallel processing, where the values of the skip indicators indicate whether operations specified by one or more subsequent vector instructions following the skip instruction should be performed in the corresponding lanes of parallel processing or not.

As indicated above, the skip indicator in one embodiment comprises a skip counter which is assigned a value upon execution of the skip instruction. In particular, a skip counter is set to a non-zero value to identify that one or more subsequent vector instructions should be skipped in the associated lane, and is considered not set when at a zero value, thereby indicating that no skipping should take place in the associated lane. Thus, in such embodiments, the operations of the following vector instructions are performed on the lane only if the skip counter is zero. The non-zero value of the skip counter is used in one embodiment to indicate the number of following instructions whose associated operations are not to be performed on the lane, and as each vector instruction is executed after the skip instruction then, for each lane having a set skip counter, the vector execution unit decrements the relevant skip counter rather than performing the operation in that lane. When the indicated number of instructions have passed, the skip counter is then back at a zero value, and further following instructions can be performed on the lane.

As an alternative to using a skip counter that is set to a certain non-zero value and then decremented as each subsequent vector instruction is executed, the skip indicators can instead be set by a skip instruction, and then remain set until execution of a skip end instruction. Execution of the skip end instruction in one embodiment clears any set skip indicator, such that operation of any following instructions are then performed in the associated lane. Alternatively skip instructions can be arranged to increment the skip counters, and skip end instructions to decrement the skip counters, such that nested combinations of skip instructions and associated skip end instructions can be used.

The skip counters can be implemented in a variety of ways. For example, representations other than having zero as a clear (no skip) value are possible. In one embodiment the skip counter is a four-bit field for each lane, but other numbers of bits can be allocated to each skip counter.

As will be discussed in more detail later, in one embodiment both skip indicators taking the form of skip counters decremented by execution of each subsequent vector instruction (referred to herein as short skip indicators), and skip indicators that remain set until a skip end instruction is executed (referred to herein as long skip indicators) can be used.

The execute stage 104 of the vector processing unit 102 can be arranged to perform a variety of arithmetic logical operations such as AND, OR, XOR, and NOT, shift operations such as LSR, LSL, ASR, and ROT, addition, subtraction, and multiplication operations, and minimum and maximum operations, i.e. finding minimum and maximum values within each lane. In addition to these operations acting independently on each lane, inter lane operations are possible, i.e. operations which swap or copy data between lanes. Exclusion of any of these operations on any of the lanes is thus selectably possible by the use of skip instructions.

Figure 2:
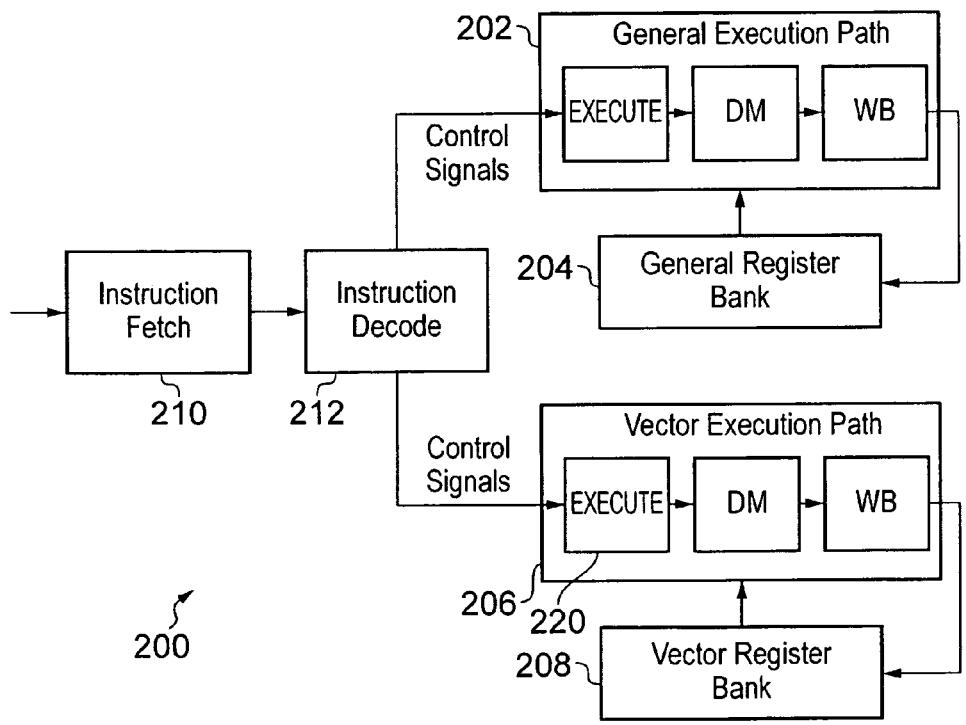
FIG. 2 schematically illustrates a processor according to an embodiment.

FIG. 2 schematically illustrates a processor 200 according to one embodiment. The processor 200 has a general execution unit 202 (also referred to herein as a general execution path) and a general register bank 204 associated with the general execution unit 202. The processor 200 further has a vector execution unit 206 (also referred to herein as a vector execution path) and an associated vector register bank 208, similar to the arrangement demonstrated with reference to FIG. 1. The processor also comprises an instruction fetch and instruction decoding unit being common for the general execution unit 202 and the vector execution unit 206. The instruction fetch and instruction decoding unit in one embodiment comprises an instruction fetch stage 210 arranged to fetch instructions, e.g. by sending a program counter value to a program memory, such as an instruction cache, in order to read the next instruction. The instruction fetch and instruction decoding unit in one embodiment further comprises an instruction decode stage 212 arranged to produce control signals for execution from the instruction bits. The instruction decode stage 212 is also arranged to distinguish between vector instructions and general instructions, where the control signals are provided to the general execution unit 202 in case of a general instruction, and to the vector execution unit 206 in case of a vector instruction. The control signals can be regarded as "decoded instructions". In case of a vector skip instruction, appropriate control signals are provided to the vector execution unit 206 where the skip instruction is executed as outlined earlier with reference to FIG. 1.

FIG. 3 schematically illustrates a vector register bank 300 according to an embodiment. The vector register bank 300 comprises a first number k of vector registers. Each vector register comprises a second number l of data elements (one for each of l lanes of parallel processing), where each data element comprises a third number m of bits, i.e. each register comprises l×m bits. According to one embodiment, there are 16 vector registers of 128 bits divided into 8 data elements of 16 bits each, i.e. k=16, l=8, m=16. Other values of k,l,m are of course equally possible.

Figure 4:
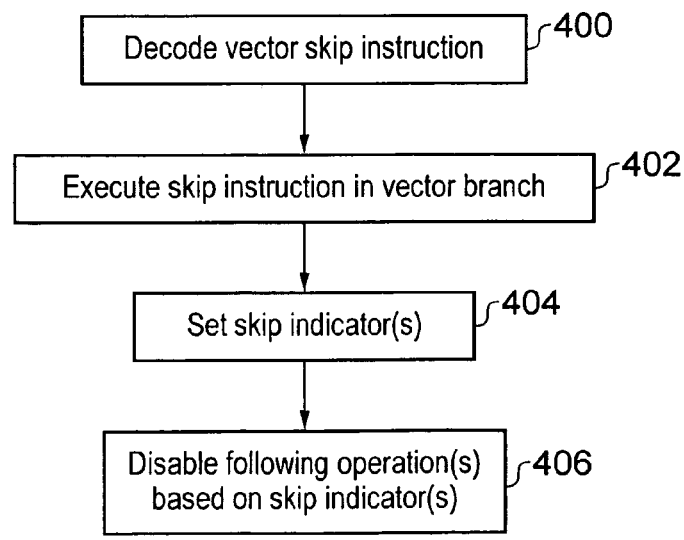
FIG. 4 is a flow chart illustrating a method according to an embodiment.

FIG. 4 is a flow chart illustrating a method according to an embodiment. Upon reception, i.e. instruction fetch, of a vector skip instruction, the instruction is identified as a vector instruction and decoded in a vector skip instruction decoding step 400, where control signals for execution are then provided to the vector execution unit 206, as elucidated above, for execution in a skip instruction execution step 402.

There are a number of ways in which the vector execution unit 206 may determine the lanes whose skip indicators are to be set on execution of the vector skip instruction. In one embodiment, the vector skip instruction directly identifies one or more lanes whose skip indicators are to be set. Hence, as an example a particular form of vector skip instruction may specify that all odd lanes should have their skip indicators set, another form of vector skip instruction may specify that all even lanes should have their skip indicators set, or more generally the vector skip instruction may identify some form of bit mask identifying which lanes should have their skip indicators set.

However, in an alternative embodiment, the vector skip instruction does not directly identify the lanes whose skip indicators are to be set, and instead, responsive to the vector skip instruction, the vector execution unit 206 evaluates for each lane whether one or more predetermined conditions are met, and identifies one or more lanes whose skip indicators are to be set dependent on said evaluation.

Irrespective of which the above approaches is used, for each lane for which it is determined that the skip indicator should be set, a skip indicator for that lane is then set in a skip indicator setting step 404, such that the operations of one or more following vector instructions are disabled for those lanes based on their skip indicators in an operation disabling step 406.

Figure 5:
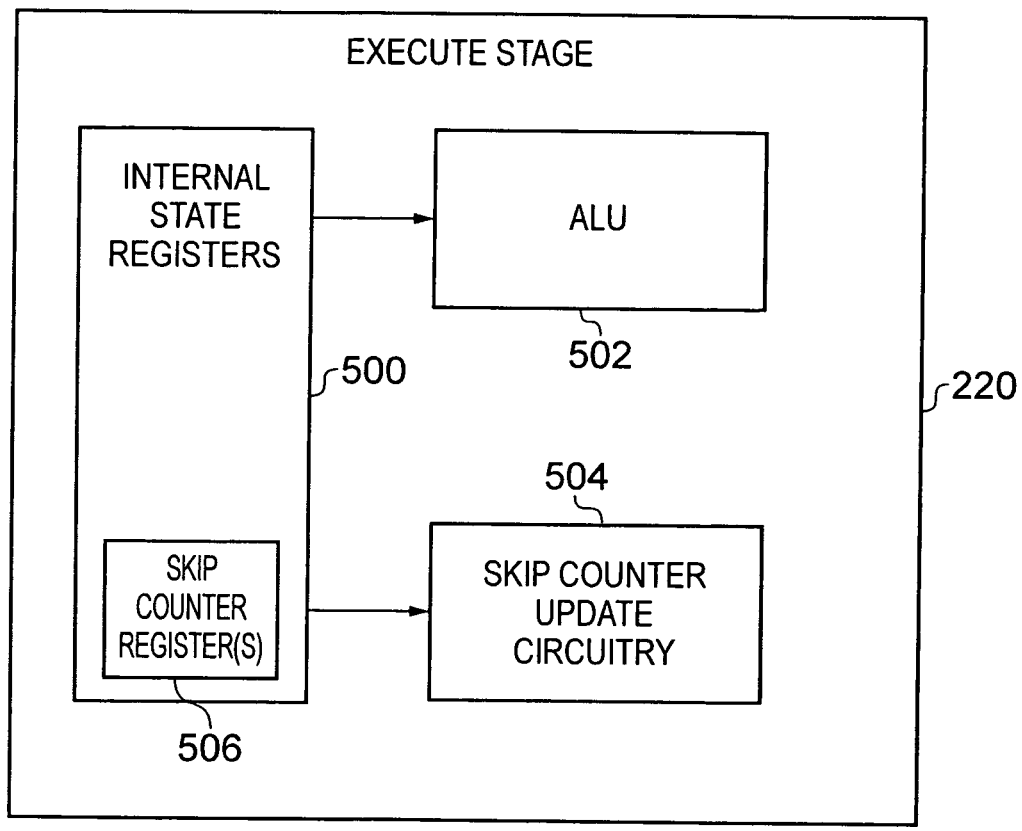
FIG. 5 illustrates in more detail elements provided within the execute stage of the vector execution path of FIG. 2 in accordance with one embodiment.

FIG. 5 schematically illustrates certain elements provided within the execute stage 220 of the vector execution path 206 in accordance with one embodiment. Internal state registers 500 are used for storing the data elements required by the execute stage 220 in order to perform its required operations. Hence for a vector operation instruction specifying one or more vector registers as source operands, the required data elements from those vector registers will be stored within the internal state registers 500 for access by the ALU circuitry 502 when performing the arithmetic logical operation specified by that instruction.

Additionally, the internal state registers 500 include one or more registers used as skip counter registers 506, which are used to maintain the skip count values for each of the lanes of parallel processing. When a vector skip instruction is executed, the corresponding control signals are passed from the instruction decode stage 212 to the execute stage 220, where the skip counter update circuitry 504 performs an update operation in order to set one or more of the skip counters within the skip counter register(s) 506, using the technique discussed earlier. Typically, for any lanes where the associated skip counter is already non-zero, the update operation is omitted, and accordingly the update operation only affects the value of the skip counters for those lanes where currently the skip counter value is zero. This allows nesting of vector skip instructions, allowing complex sequences of conditional operations to be performed within the vector processing unit without any modification to the vector operation instructions themselves. Instead, the lanes of parallel processing that are subjected to any particular vector operation are determined by the state of the various skip count values at the time the associated vector operation instruction is executed.

Execution of a vector operation instruction in embodiments where skip indicators are provided for each lane can be denoted by the following pseudo-code, which assumes there are eight lanes (lanes 0 to 7) of parallel processing:

```
VOP:
FOR I=0:7 DO IN PARALLEL
IF SKIP_COUNTER[I]==0 THEN
    EXECUTE OP ON LANE I
ELSE
    SKIP_COUNTER[I]=SKIP_COUNTER[I] - 1
END IF
END FOR
```

Here, skip_counter[I] refers to skip counter for lane I. As can be seen from the above pseudo-code, the operation is applied to any lane having a skip counter of zero, but for those lanes having a non-zero skip counter, the operation is not performed and instead the skip count value is decremented by one.

Whenever a vector skip instruction, i.e. an instruction which may set the skip counters, is encountered, as with ordinary instructions, only lanes having their skip counter clear (i.e. zero) are affected. For each such lane, the condition associated with the skip instruction is tested on that lane and if it is met, the skip counter for that lane is set to the number of instructions to be skipped. This is typically specified as an operand of the skip instruction and hence passed as an argument "new_skip_value". For each subsequently executed vector instruction, lanes for which the skip counter was non-zero have the value of their skip counters decreased by one. A vector skip instruction of the above embodiment can be represented by the following pseudo-code:

```
VSCC:
FOR I=0:7 DO IN PARALLEL
IF SKIP_COUNTER[I]==0 THEN
    IF CC ON LANE I THEN
        SKIP_COUNTER[I]=NEW_SKIP_VALUE
    END IF
ELSE
    SKIP_COUNTER[I]=SKIP_COUNTER[I]-1
END IF
END FOR
``` where the condition code cc for example can be any of eq=equal, ne=not equal, gt=greater than, ge=greater or equal than, lt=less than, le=less or equal than.

Sometimes it is preferable to use a construction where a lot of instructions are skipped, but the skip counter can only count to a certain value defined by the skip counter field, e.g. fifteen for a four bit counter. However, in one embodiment, there is also a possibility to encode a long skip which is only terminated when a vector skip end instruction for ending the skip feature is encountered. This can be achieved by providing an entirely separate skip counter register for storing long skip indicators, or by reserving one or more certain values of a single skip counter per lane, e.g. numbers 14 and 15, to be special long skip codes, and then modifying the pseudo code operation described above. In particular suitable pseudo code operation for VOP (general vector instruction), VSCC (vector skip instruction) and VEND (vector skip end instruction) is as follows:

```
VOP:
FOR I=0:7 DO IN PARALLEL
IF SKIP_COUNTER[I]==0 THEN
    EXECUTE OP ON LANE I
ELSE IF (SKIP_COUNTER[I]<14)
    SKIP_COUNTER[I]=SKIP_COUNTER[I]-1
END IF
END FOR
VSCC:
FOR I=0:7 DO IN PARALLEL
IF SKIP_COUNTER[I]==0 THEN
    IF CC ON LANE I THEN
        IF LONG_SKIP THEN
            SKIP_COUNTER[I]= 15
        ELSE
            SKIP_COUNTER[I]=NEW_SKIP_VALUE
        END IF
    END IF
ELSE
    IF LONG_SKIP OR SKIP_COUNTER[I]<14 THEN
        SKIP_COUNTER[I]=SKIP_COUNTER[I]-1
    END IF
END IF
END FOR
VEND:
FOR I=0:7 DO IN PARALLEL
IF SKIP_COUNTER[I]>=14 THEN
    SKIP_COUNTER[I]=(SKIPCOUNTER[I]+1) MOD 16
ELSE IF SKIP_COUNTER[I]>0 THEN
    SKIP_COUNTER[I]=SKIP_COUNTER[I]-1
END IF
END FOR
```

Hence, in the above example, it can be seen that the pseudo-code for the general vector instruction VOP is generally as described before, but now the skip counter is only decremented for those lanes having a non-zero skip counter if the skip count value is less than 14. Hence, if the skip count value is 14 or 15, then no operation is performed in the associated lane and no decrementing of the skip counter takes place.

Considering the vector skip instruction VSCC, then for each lane having a zero skip count value, if the condition code for that lane is met, there are now two ways in which the skip count value may be updated. If the vector skip instruction encodes a long skip (typically by setting the skip indicator operand of that instruction to a null value), then the skip counter is set to 15, the value of 15 in this embodiment encoding one long skip. Otherwise, the skip counter is set to the skip value which will typically be specified by the skip indicator operand of the vector skip instruction.

Considering the skip counter decrementing function of the VSCC instruction, if the skip counter for any particular lane is less than 14 at the time the vector skip instruction is executed (i.e. the skip counter encodes a short skip), then the skip counter is decremented. In addition, even if the skip counter for any particular lane is not less than 14, if the vector skip instruction encodes a long skip, the skip counter is still decremented. This latter decrementing operation allows the nesting of two long skips, with the first long skip instruction setting the skip counter to 15 (meaning one long skip), and the second, nested, long skip instruction then lowering the skip counter to 14 (meaning two long skips) for the lanes already affected by the first long skip instruction. Hence this decrementing operation actually identifies an effective increment in the number of long skips due to the above encoding.

With regard to the vector skip end instruction VEND, then for each lane, it is tested whether the skip counter is greater than or equal to 14 (i.e. whether the skip counter for that lane encodes a long skip) and if it is the skip counter is modified as shown. This gives an effective decrement of the long skip count, given the encoding of this embodiment, where the value of 14 indicates two long skips, and the value of 15 indicates one long skip. In particular, if the current skip count value is 14, it is raised to 15, and if the current skip count value is 15, it is reset to zero given the mod 16 nature of the increment. If the skip counter is not greater than or equal to 14 but is greater than zero, then occurrence of the VEND instruction merely causes the skip counter to be decremented by 1, just like for any other vector instruction.

Figure 6:
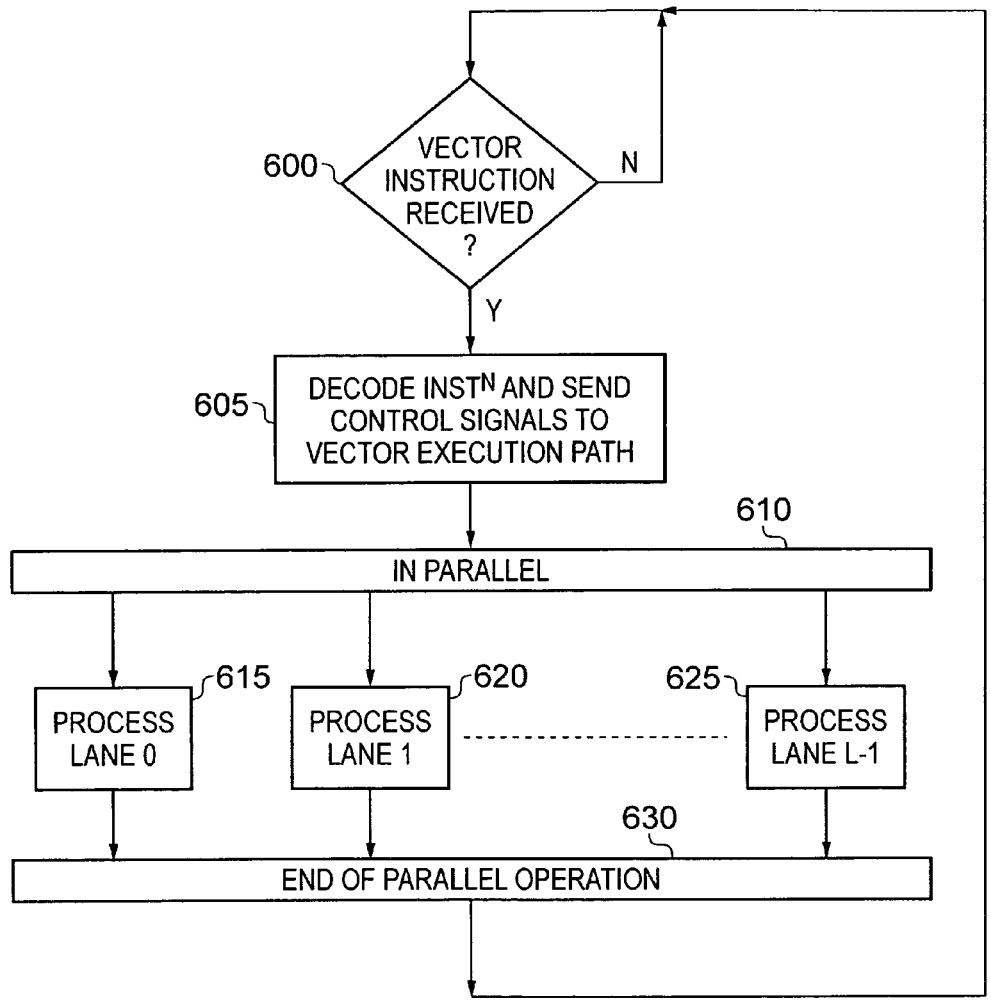
FIG. 6 is a flow diagram schematically illustrating the execution of vector instructions in accordance with one embodiment.

FIG. 6 is a flow diagram illustrating how vector instructions are processed in accordance with embodiments of the present invention. At step 600, receipt of a vector instruction is awaited, and once a vector instruction has been received (i.e. has been fetched by the instruction fetch stage 210), it is then decoded at step 605 by the instruction decode stage 212 into control signals which are then sent to the vector execution path 206. As shown by the block 610, this then causes a particular sequence of steps to be performed in parallel in each of the lanes of parallel processing, this processing being illustrated by the steps 615, 620, 625. Once this sequence of steps has been formed in parallel in each of the lanes, then as indicated by the box 630, the parallel processing steps end, and the process returns to step 600 to await execution of the next vector instruction.

Figure 7:
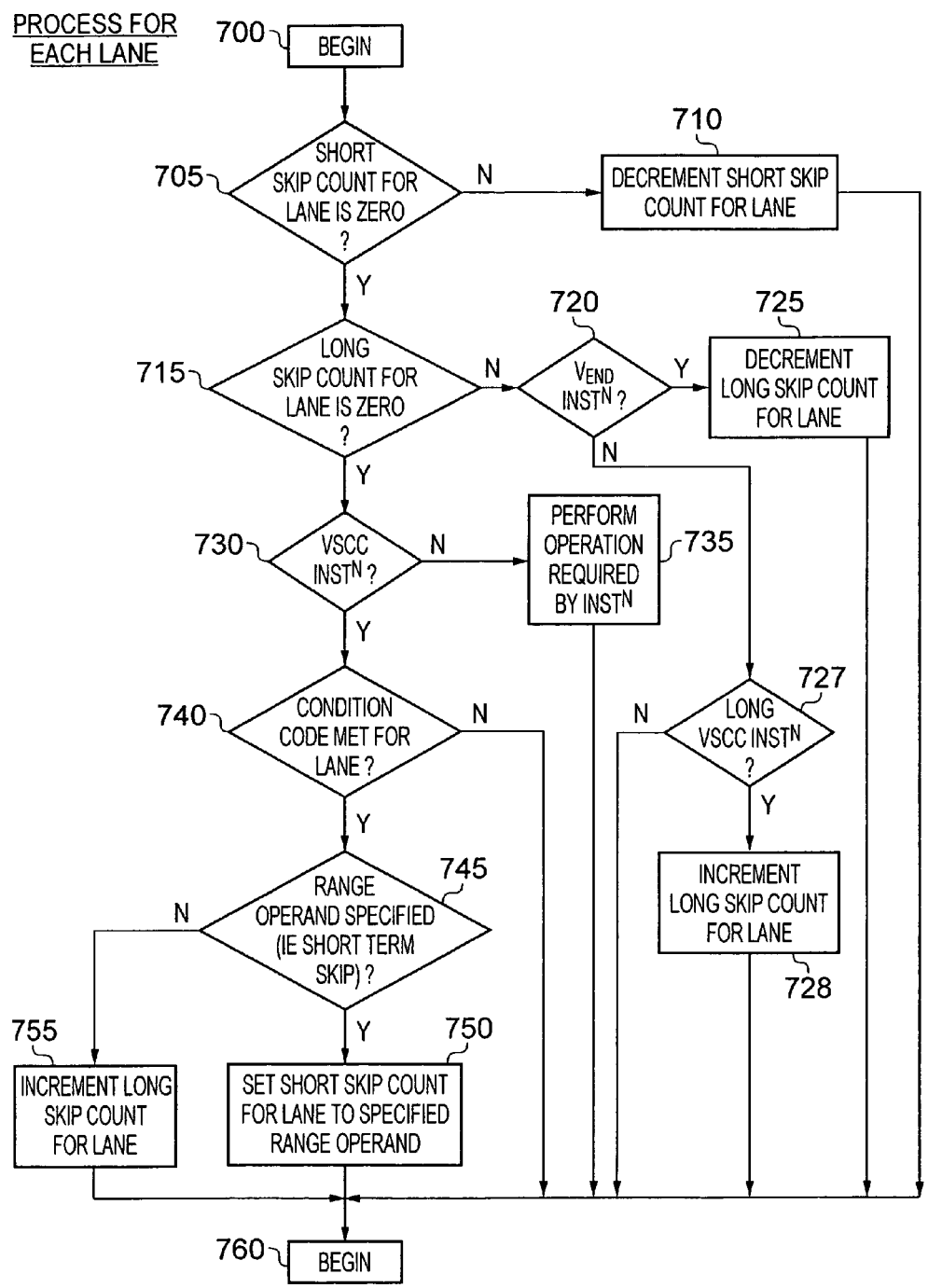
FIG. 7 is a flow diagram illustrating in more detail the processing performed within each lane when executing vector instructions in accordance with one embodiment.

The processing performed in each lane to implement steps 615, 620, 625 in accordance with one embodiment is illustrated schematically in FIG. 7. The process begins at step 700, and at step 705 it is determined whether the short skip count value (i.e. the short skip indicator) for the lane is zero. If the skip count value is non-zero, then the process branches to step 710 where the skip count value is decremented for that lane. Thereafter, the process proceeds to step 760 where the process ends, as no further processing is required.

It is worth noting that at step 705 it is only the short skip count value which is assessed to determine whether it is non-zero. In some embodiments, only short skip count values will be utilised, but in some embodiments long skip count values are also used, in which case then additional steps 715, 720, 725 are required. In particular, following analysis of the short skip count value at step 705, it is then determined at step 715 whether the long skip count value for the lane is zero. As mentioned earlier, the short skip count values and long skip count values can be stored in separate skip registers, or alternatively in one embodiment can be encoded within a single register by reserving one or more skip count values to be long skip count values. If the long skip count value is not zero, then it is determined at step 720 whether the instruction being executed is a vector skip end instruction. If it is, then the long skip count value for the lane is decremented at step 725 and the process then ends at step 760. From the earlier discussions, it will be appreciated that in the above embodiment where a skip count value of 14 indicates 2 long skips, a skip count value of 15 indicates 1 long skip, and a skip count value of 0 indicates no long skip, the decrementing at step 725 actually involves incrementing the skip count value (either from 14 to 15, or from 15 to 0).

If the instruction is not a vector skip end instruction, then it is determined at step 727 whether the instruction is a long vector skip instruction (i.e. a vector skip instruction encoding a long skip). If it is then the long skip count for the lane is incremented at step 728. From the earlier discussions, it will be appreciated that in the above embodiment where a skip count value of 14 indicates 2 long skips and a skip count value of 15 indicates 1 long skip, the incrementing at step 728 actually involves decrementing the skip count value from 15 to 14. Hence, via steps 727 and 728, any long vector skip instruction unconditionally increments by one the long skip count of any lane having a non-zero long skip count, since those long skip counts will be decremented by one by the long vector skip instruction's corresponding vector skip end instruction.

If at step 727 it is determined that the instruction is not a long vector skip instruction, no action is required and the process merely ends at step 760.

If both the short skip count value and any long skip count value provided for the lane are zero, then the process proceeds to step 730. At step 730, it is determined whether the current instruction is a vector skip instruction. If it is not, then the required operation specified by the instruction is performed at step 735, whereafter the process ends at step 760. As a result, it can be seen that the operation specified by any vector operation instruction is only performed in a lane if its skip count value (both short and long if both are used) is not set, i.e. is zero.

If it is determined at step 730 that the current instruction is a vector skip instruction, then it is assessed at step 740 whether the condition code for that lane is met. As an example, the vector skip instruction may specify that the skip indicator should only be set if a particular condition code maintained by the vector processing unit for that lane is set. If the condition code is not met, then no further action is required and the process ends at step 760. However, if the condition code is met, then the process proceeds to step 745.

At step 745, it is determined whether a range operand has been specified by the vector skip instruction (this range operand also being referred to herein as a skip indicator operand). If such a range operand is specified, then this indicates that the vector skip instruction is intended to set the short skip counter, and accordingly in that event the process proceeds to step 750 where the short skip count for the lane is set to the specified range operand. Thereafter the process ends at step 760. However, if at step 745 it is determined that a null range operand is specified, then this means that the vector skip instruction is intended to set the long skip counter for the lane, and accordingly the process branches to step 755 where the long skip count value for the lane is incremented, whereafter the process ends at step 760. From the earlier discussions, it will be appreciated that in the above embodiment where a skip count value of 15 indicates 1 long skip, and a skip count value of 0 indicates no long skip, the incrementing at step 755 actually involves setting the skip count value to 15 to identify one long skip.

Figure 8A:
FIGS. 8A to 8C schematically illustrate different formats of skip counter registers used in accordance with different embodiments.

There are a number of ways in which the skip counter register 506 can be arranged. In one embodiment, only short skip counters are used, and as shown in FIG. 8A a single skip counter register 800 can be provided storing a short skip count value for each lane. In one embodiment, each skip count value is 4 bits, and accordingly in an example where there are 8 lanes of parallel processing, the skip counter register will be a 32 bit register.

In an alternative embodiment, long skip count values may also be provided for each lane of parallel processing, and may be encoded within a separate register. Accordingly, as shown in FIG. 8B, a first register 805 may be used to store the skip count values for each lane (i.e. the short skip indicators), whilst a second register 810 may be used to store the long count values (i.e. the long skip indicators) for each lane.

It will also be appreciated that in certain embodiments, it can be arranged that only long skip indicators are used, and no short skip count values are provided. In that example, a single register such as the register 800 of FIG. 8A may be provided, in this case the register providing a long skip count value for each lane. In that example embodiment, the vector skip instructions will set the long skip count values, and only occurrence of a vector skip end instruction will cause those values to be decremented. The standard vector instructions will then be executed on any lanes whose long skip count values are zero, and will merely be ignored for any lanes whose long skip count values are set (i.e. non zero).

Figure 8C:
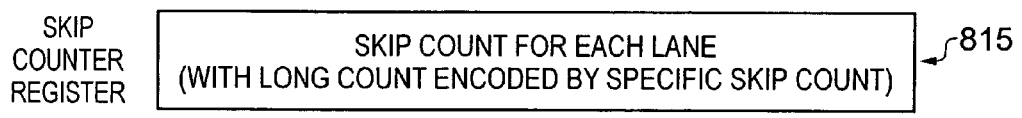
Figure 8B:
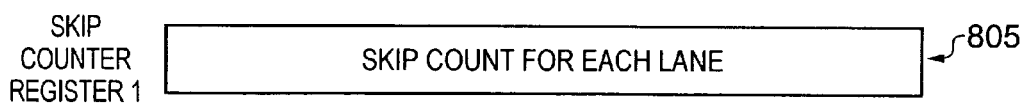
Figure 8B:
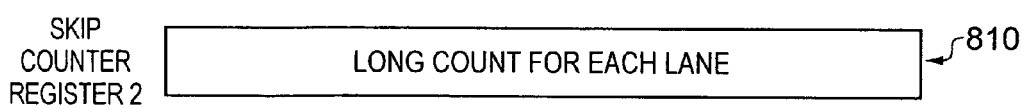

As shown in FIG. 8C, for embodiments where both short skip count values and long skip count values are used, then it is possible still to use a single skip counter register 815 to encode the skip count value for each lane. In such an embodiment, any long skip count value can be encoded by using a specific skip count value. In one particular example, the values 14 and 15 are reserved for long skip counts, as illustrated schematically by the table of FIG. 9.

As shown in FIG. 9, for each lane of parallel processing, the skip count value can be set to any of the combined encoding values 0 to 15. A value of 0 indicates that neither the short skip counter nor the long skip counter is set, and accordingly with reference to FIG. 7 the yes path through steps 705 and 715 will be followed for any lane whose skip counter has a combined encoding of zero. Values between 1 and 13 may be set as a combined encoding in order to specify a set short skip count. As each subsequent vector instruction is executed, it will then cause the set short skip value for that lane to be decremented (instead of the operation specified by the vector instruction being performed), until the value eventually reaches 0, at which point subsequent vector instructions will be executed in that lane. Hence, considering the example of FIG. 7, if the combined encoding has a value between 1 and 13 at the time step 705 is evaluated, then the process will branch to step 710 where the short skip count value will be decremented.

As shown in FIG. 9, the combined encoding values 14 and 15 are reserved for long skip counts, and hence if for a particular lane the combined encoding is 14 or 15, then the yes path from step 705 will be followed and at step 715 the no path will be followed. If at step 720, a VEND instruction is being executed, then the long skip count will be decremented. As shown by FIG. 9, this will mean that if the current combined encoding is 14 (identifying a long skip count of two) it will now be set to 15 (identifying a long skip count of one) and if the current combined encoding is 15 it will now be cleared to 0.

Figure 10:
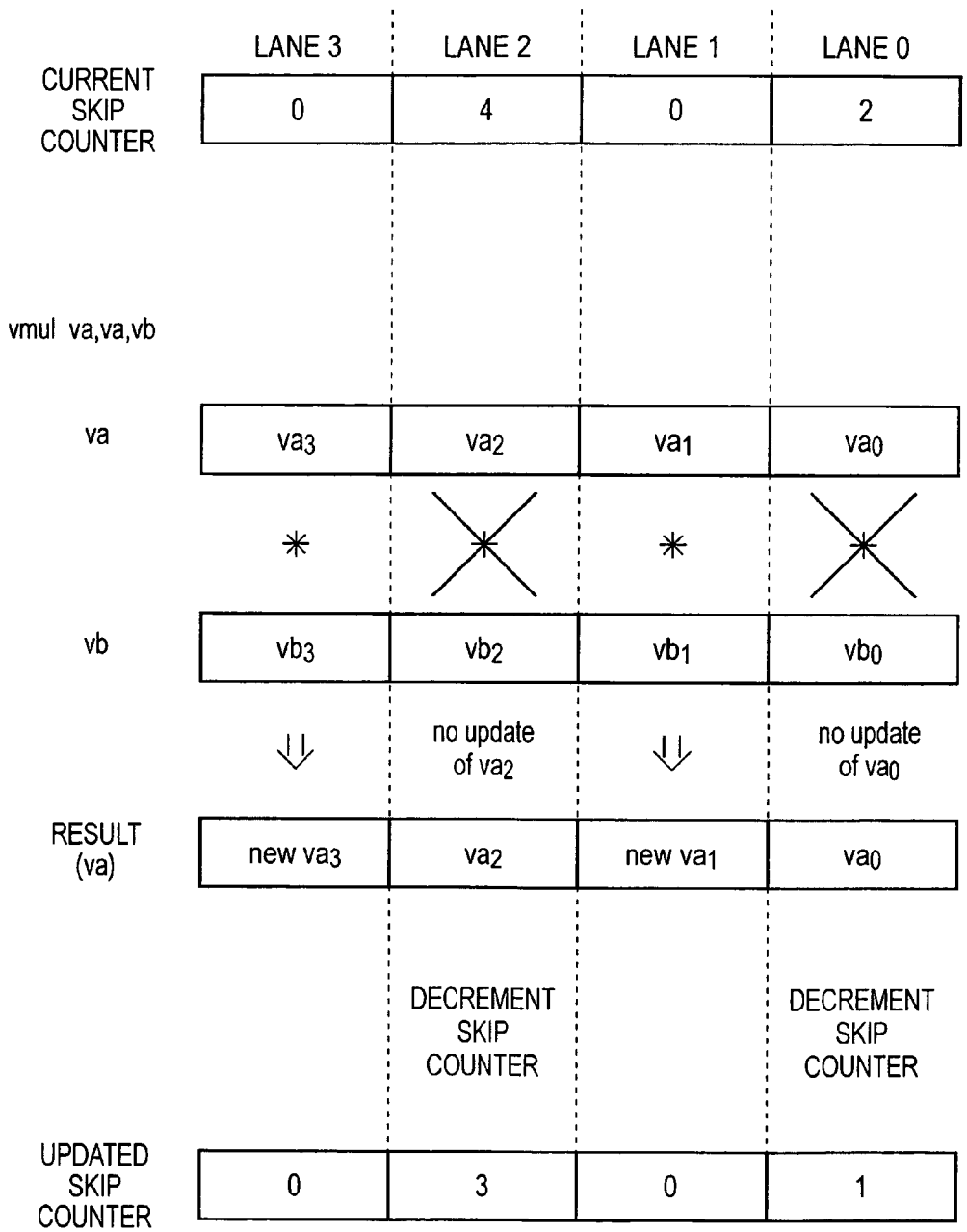
FIG. 10 is a diagram schematically illustrating the use of the skip counters in accordance with one embodiment.

FIG. 10 schematically illustrates the use of short skip counters for an example where four lanes of parallel processing are provided. In this example, it is assumed at the time that a VMUL instruction (a multiply instruction) is executed that lanes 1 and 3 have a skip count value of zero and lanes 0 and 2 have skip count values of two and four, respectively. This means that the multiply instruction is only performed in lanes 1 and 3. Whilst the relevant components within lanes 0 and 2 may in one embodiment still go through the motions of performing the multiply operation, no update of the destination register va occurs in either lanes 0 or 2. This means that the data elements $va_0$ and $va_2$ remain unchanged whilst the data elements $va_1$ and $va_3$ are updated to reflect the result of the multiply operation.

For lanes 0 and 2, the skip counters are then decremented so that after the multiply instruction has been executed, the skip counters for lanes 1 and 3 remain at zero and the skip counters for lanes 0 and 2 are now 1 and 3, respectively. FIG. 10 merely iterates a very simple example, and it will typically be the case that there will be more lanes. Further, the vector skip instructions can be nested as required to allow complex sequences of instructions to be executed conditionally within the various lanes.

The following is an example of a sequence of instructions that can be executed using nested sequences of vector skip instructions. In particular, in this example the median of three values is computed within each lane using the input vectors v0,v1,v2, and the result is output as the vector v3. Hence, through execution of these instructions, there is output for each lane the median of the three values for the same lane in the input registers:

vmov v3,v2 // v2 is copied into v3 for each lane. Here it is "guessed" that the median is the value in v2 (if it is not, it will be overwritten by the following)

```
vsgt v0,v1,4   // for each lane compares v0 and v1, and if v0>v1 sets skip value to 4
    vsgt v1,v2,1   // we now know v0<=v1 (for each lane compares v1 and v2, and if
                      v1>v2 sets skip value to 1)
        vmov v3,v1   // we now know v1<=v2, median is v1
    vsgt v2,v0,1   // we now know v0<=v1 (for each lane compares v2 and v0, and if
                      v2>v0 sets skip value to 1)
        vmov v3,v0   // we now know v2<=v0, median is v0
vsle v0,v1,4   // for each lane compares v0 and v1, and if v0<=v1 sets skip
                  value to 4
    vsle v1,v2,1   // we now know v0>v1 (for each lane compares v1 and v2, if
                      v1<=v2, sets skip value to 1)
        vmov v3,v1   // we now know v1>v2, median is v1
    vsle v2,v0,1   // we now know v0>v1 (for each lane compares v2 and v0, and if
                      v2<=v0, sets skip value to 1)
        vmov v3,v0   // we now know v2>v0, median is v0
```

Through the sequence of vector skip instructions (vsgt and vsle), a complex tree of tests can be performed independently in each lane in order to find the median data element value in each lane. It will be appreciated that after the first move instruction, all of the subsequent move instructions will only conditionally be performed in each lane, dependent on the value of the skip counters for those lanes at the time the move instructions are encountered.

From the above description of embodiments, it will be appreciated that such embodiments provide a particularly flexible and efficient way of handling vector operations within a vector processing unit. In particular, it is possible to conditionally perform vector operations within each lane of parallel processing provided by the vector processing unit, without needing to modify the vector instructions specifying those vector operations. Instead, vector skip instructions are used to set skip indicators for each of the lanes of parallel processing, with subsequent vector instructions only being performed in lanes whose skip indicators have not been set. In embodiments where the skip indicators take the form of skip counters, it is possible to nest the skip instructions so that complex sequences of conditional operations can be performed independently in each of the lanes of parallel processing. This hence enables an increase in the utilisation of the vector processing unit to be achieved, since operations which might otherwise have to be performed in a serial manner can now be processed in parallel using the vector processing unit, given the ability to selectively exclude one or more lanes of parallel processing from the performance of those operations.

Whilst the above described techniques may be performed by hardware executing a sequence of native instructions which include the above-mentioned instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described vector skip, vector operation and vector skip end instructions may be executed as native instructions to the full or partial virtual machine, with the virtual machine together with its underlying hardware platform operating in combination to provide the vector processing described above.

Although particular embodiments have been described herein, it will be appreciated that the invention is not limited thereto and that many modifications and additions thereto may be made within the scope of the invention.

We claim:

1. A method of handling vector instructions within a data processing apparatus comprising a register data store having a plurality of registers arranged to store data elements, and a vector processing unit for executing a sequence of vector instructions, the vector processing unit having a plurality of lanes of parallel processing and having access to the register data store in order to read data elements from, and write data elements to, the register data store during the execution of said sequence of vector instructions, the method comprising the steps of:
    maintaining within a skip indication storage a skip indicator for each of said lanes of parallel processing;
    responsive to a vector skip instruction within said sequence of vector instructions, performing an update operation to set within the skip indication storage the skip indicator for a determined one or more lanes of said plurality of lanes;
    responsive to a vector operation instruction within said sequence of vector instructions, performing an operation in parallel on data elements input to said plurality of lanes of parallel processing, but excluding from the performance of said operation any lane whose associated skip indicator is set;
    each said skip indicator comprising a skip count value which is considered set when having a non-zero value and is considered not set when having a zero value;
    responsive to the or skip instruction, setting the skin count value for said determined one or more lanes to a predetermined non-zero value; and
    for each vector instruction within said sequence, if said skip count value is set at the time that vector instruction is executed, decrementing the skip count value instead of performing the operation specified by that vector instruction.

2. A non-transitory computer program product comprising computer readable instructions which when executed on a computer cause the computer to perform a method of handling vector instructions as claimed in claim 1.

3. A data processing apparatus comprising:
    a register data store having a plurality of registers arranged to store data elements;
    a vector processing unit for executing a sequence of vector instructions, the vector processing unit having a plurality of lanes of parallel processing and having access to the register data store in order to read data elements from, and write data elements to, the register data store during the execution of said sequence of vector instructions;
    a skip indication storage for maintaining a skip indicator for each of said lanes of parallel processing;
    the vector processing unit being responsive to a vector skip instruction within said sequence of vector instructions to perform an update operation to set within the skip indication storage the skip indicator for a determined one or more lanes of said plurality of lanes; and
    the vector processing unit being responsive to a vector operation instruction within said sequence of vector instructions to perform an operation in parallel on data elements input to said plurality of lanes of parallel processing, but to exclude from the performance of said operation any lane whose associated skip indicator is set;
    wherein:
    each said skip indicator comprises a skip count value which is considered set when having a non-zero value and is considered not set when having a zero value;
    the vector processing unit is responsive to the vector skip instruction to set the skip count value for said determined one or more lanes to a predetermined non-zero value; and
    for each vector instruction within said sequence if said skin count value is set at the time that vector instruction is executed, the vector processing unit is arranged to decrement the skip count value instead of preforming the operation specified by that vector instruction.

4. A data processing apparatus as claimed in claim 3, wherein when executing the vector skip instruction, the vector processing unit excludes from the update operation any skip indicators that are already set at the time that vector skip instruction is executed.

5. A data processing apparatus as claimed in claim 3, wherein the predetermined non-zero value is specified as an operand of the vector skip instruction.

6. A data processing apparatus as claimed in claim 3, wherein when executing said vector skip instruction the vector processing unit is arranged to decrement all set skip count values.

7. A data processing apparatus as claimed in claim 3, wherein:
said skip indication storage further maintains a long skip indicator for each of said lanes of parallel processing;
a further vector skip instruction is provided, which when executed by the vector processing unit causes the long skip indicator for each of said determined one or more lanes to be set instead of the skip count values for those lanes;
the long skip indicators remaining set as each vector instruction is executed.

8. A data processing apparatus as claimed in claim 7, wherein:
the vector processing unit is responsive to a vector skip end instruction to clear each set long skip indicator.

9. A data processing apparatus as claimed in claim 7, wherein:
each long skip indicator comprises a long skip count value which is considered set when having a non-zero value and is considered not set when having a zero value;
responsive to the further vector skip instruction, the vector processing unit causes the long skip count value for each of said determined one or more lanes to be incremented; and
the vector processing unit is responsive to a vector skip end instruction to decrement each set long skip count value.

10. A data processing apparatus as claimed in claim 7, wherein:
the skip indication storage comprises a first register for storing the skip indicators for each of said lanes of parallel processing, and a second register for storing the long skip indicators for each of said lanes of parallel processing.

11. A data processing apparatus as claimed in claim 7, wherein the skip indication storage comprises a register for storing the skip indicators for each of said lanes of parallel processing, each skip indicator being settable by the vector processing unit to any of a first plurality of non-zero values to identify set skip count values, and being settable to at least one predetermined non-zero value not in said first plurality to identify a set long skip indicator.

12. A data processing apparatus as claimed in claim 7, wherein said vector skip instruction specifies as a skip indicator operand the predetermined non-zero value to which the skip indicators for said determined one or more lanes are to be set, and the further vector skip instruction specifies as said skip indicator operand a null value to thereby distinguish the further vector skip instruction from said vector skip instruction.

13. A data processing apparatus as claimed in claim 3, wherein said vector skip instruction directly identifies the determined one or more lanes whose skip indicators are to be set.

14. A data processing apparatus as claimed in claim 3, wherein, responsive to the vector skip instruction, the vector processing unit evaluates for each lane whether one or more predetermined conditions are met, and identifies said determined one or more lanes whose skip indicators are to be set dependent on said evaluation.

15. A data processing apparatus as claimed in claim 14, wherein said determined one or more lanes are those for which said one or more predetermined conditions are met.

16. A data processing apparatus as claimed in claim 14, further comprising:
condition code storage for storing at least one condition code for each of said lanes of parallel processing;
the vector processing unit being arranged to evaluate for each lane whether said one or more predetermined conditions are met by checking whether said at least one condition code is set.

17. A data processing apparatus as claimed in claim 3, wherein for any lane excluded from the performance of said operation, the operation is performed within that lane but a result value produced by the performance of the operation in that lane is discarded.

18. A data processing apparatus as claimed in claim 3, wherein:
said register data store comprises a vector register bank comprising a plurality of vector registers, each vector register storing a plurality of data elements to be provided to different lanes of parallel processing within said vector processing unit.

19. A data processing apparatus as claimed in claim 3, further comprising:
a scalar processing unit;
a scalar register bank associated with the scalar processing unit; and
an instruction fetch and instruction decoding unit shared between said scalar processing unit and said vector processing unit.

20. A data processing apparatus as claimed in claim 3, wherein the vector processing unit is a pipelined processing unit allowing multiple vector instructions to be in the process of execution at any one time.

21. A data processing apparatus comprising:
register data store means having a plurality of register means for storing data elements;
vector processing means for executing a sequence of vector instructions, the vector processing means for providing a plurality of lanes of parallel processing and for having access to the register data store means for reading data elements from, and writing data elements to, the register data store means during the execution of said sequence of vector instructions;
skip indication storage means for maintaining a skip indicator for each of said lanes of parallel processing;
the vector processing means, responsive to a vector skip instruction within said sequence of vector instructions, for performing an update operation to set within the skip indication storage means the skip indicator for a determined one or more lanes of said plurality of lanes; and
the vector processing means, responsive to a vector operation instruction within said sequence of vector instructions, for performing an operation in parallel on data elements input to said plurality of lanes of parallel processing, but for excluding from the performance of said operation any lane whose associated skip indicator is set;
each said skip indicator comprising a skip count value which is considered set when having a non-zero value and is considered not set when having a zero value;
the vector processing means, responsive to the vector skip instruction, for setting the skip count value for said determined one or more lanes to a predetermined non-zero value; and
for each vector instruction within said sequence, if said skip count value is set at the time that vector instruction is executed, the vector processing means for decrementing the skip count value instead of performing the operation specified by that vector instruction.

* * * * *